United States Patent [19]
Van Genderen et al.

[11] Patent Number: 5,627,545
[45] Date of Patent: May 6, 1997

[54] RADAR APPARATUS

[75] Inventors: Pieter Van Genderen, Haaksbergen; Wietze J. H. Meijer, Enschede, both of Netherlands

[73] Assignee: Hollandse Signaalapparaten B. V., Hengelo, Netherlands

[21] Appl. No.: 542,940

[22] Filed: Oct. 13, 1995

[30] Foreign Application Priority Data

Oct. 25, 1994 [NL] Netherlands .............. 9401767

[51] Int. Cl.⁶ .................................. G01S 13/22
[52] U.S. Cl. ........................... 342/162; 342/137
[58] Field of Search .................... 342/162, 159, 342/111, 196, 112, 137, 160

[56] References Cited

U.S. PATENT DOCUMENTS

| | | | |
|---|---|---|---|
| 4,450,446 | 5/1984 | Clancy et al. | 342/159 |
| 4,524,358 | 6/1985 | Bergman et al. | 342/162 |
| 4,524,360 | 6/1985 | Bergman et al. | 342/196 |

FOREIGN PATENT DOCUMENTS

| | | |
|---|---|---|
| 0260670 | 3/1988 | European Pat. Off. . |
| 0323662 | 7/1989 | European Pat. Off. . |
| 2632420 | 12/1989 | France . |

OTHER PUBLICATIONS

N. Sridhar Reddy et al. "Time–Domain Estimation of Unambiguous Doppler Frequency in Low and Medium PRF Radars." Proceedings of ICASSP 83 IEEE International Conference on Acoustics, Speech and Signal Processing, Boston, MA. Apr. 14–16, 1983; IEEE, 1983, vol. 2, pp. 687–690.

H. Rohling, "Resolution of Dopplerfrequency– and Range Ambiguities." NTZ ARCHIV; Feb. 1986, vol. 8, No. 2, pp. 25–34.

Karl Gerlach et al. "Cascaded Detector for Multiple High–PRF Pulse Doppler Radars." IEEE Transactions On Aerospace And Electronic Systems; vol. 26, No. 5, Sep. 1990, pp. 754–767.

*Primary Examiner*—Daniel T. Pihulic
*Attorney, Agent, or Firm*—Oblon, Spivak, McClelland, Maier & Neustadt, P.C.

[57] ABSTRACT

The invention relates to a radar apparatus (1, 2, 3) provided with a doppler filterbank (4) and fast thresholds (5.i), for writing per pulse a range-doppler matrix in range-doppler memory (6) and the background level in background memory (7). By unfolding the range-doppler matrices and combining the unfolded range-doppler matrices for all the pulses in a burst in combination means (10), an incoherent combination of the pulses is obtained before an actual detection takes place. This cluster before detect scheme increases the detection probability for weak echoes, without increasing the false alarm rate.

7 Claims, 1 Drawing Sheet

RADAR APPARATUS

BACKGROUND OF THE INVENTION

The invention relates to a radar apparatus incorporating antenna means, transmitter means connected to the antenna means for generating bursts of radar transmitter pulses, receiver means connected to the antenna means and a doppler filterbank connected to the receiver means for the generation of a range-doppler matrix of echo strength-representing range-doppler elements for each burst, combination means for combining the range-doppler matrices obtained per burst and threshold means for thresholding the combined range-doppler matrices.

A radar apparatus of this kind is known from IEEE Transactions on Aerospace and Electronic Systems, vol. 26, no. 5, September 1990, pp. 754–766; K. Gerlach and G. A. Andrews: "Cascaded detector for multiple high-PRF pulse doppler radars". The radar apparatus described therein makes use of bursts of radar transmitter pulses with a high PRF which introduces ambiguity in the range of a target, but not in the doppler velocity of the target. By combining and thresholding the received echoes for various bursts, it will be possible to unambiguously determine the range of a target and moreover to enhance the detection probability. The method is however only suitable for high-PRF radars.

Said known method is, albeit slightly adapted, also suitable for low-PRF radars which do not give rise to ambiguity in range, but instead in doppler velocity. Low-PRF radars are of little practical significance in view of their incapability of realising adequate clutter suppression.

SUMMARY OF THE INVENTION

With state-of-the-art search radars, it will usually not be possible to limit radar transmissions to high or low-PRF types of transmissions. This means that there will be ambiguity both in range and in doppler velocity. In such situations, the present invention has for its object to combine and subsequently threshold the echoes received for different bursts. It is thereto characterised in that the combination means are designed for combining the range-ambiguous and doppler-ambiguous range-doppler matrices obtained from the bursts for obtaining a combined unambiguous range-doppler matrix and in that the threshold means are designed for thresholding the combined range-doppler matrix.

Consecutive bursts of radar transmitter pulses are usually emitted at different PRFs, since this enables the ambiguity in range and in doppler velocity of a target to be resolved. This will cause variations in the dimensions of the range-doppler matrices and will, at consecutively-obtained doppler-matrices, prevent a target from being continuously represented by the same range-doppler element. Moreover, the radar transmit frequency shall preferably be changed per burst, since this reduces the effect of fading and renders the radar apparatus less susceptible to jamming. This means that the mutual phase of echoes of consecutively transmitted pulse bursts are not correlated and that the process of combining these echoes therefore has to take place incoherently, for instance based on the addition of moduli of echoes.

According to a favourable embodiment of the invention, it is not the modulus of the echo strength that constitutes the range-doppler element, but a normalised echo strength. To this end, the background is estimated for each range-doppler element, for instance by means of a fast threshold circuit well-known in the art. The normalised echo strength will then be obtained by dividing the echo strength by the background and raising that to the square. The normalised echo strength entails the advantage that a measurement with a marked contrast, i.e. a satisfactory ratio of the measured echo strength to the estimated background is automatically assigned a higher weighting factor in the further processing than a strong target in a clutter environment. Moreover, the background estimated per range-doppler element can conveniently be stored in a background matrix in order to obtain a threshold value required for thresholding.

According to the invention, the combination means are designed for two-dimensionally unfolding and combining the ambiguous range-doppler matrices to yield unambiguous range-doppler matrices. How often the range-doppler matrices are unfolded in range direction will depend on the PRF-determined maximum unambiguous range and the maximum range specified for the radar apparatus. How often the range-doppler matrices are unfolded in doppler direction will depend on the maximum unambiguous speed determined by the PRF and the radar transmitter frequency and on the maximum doppler velocity specified for the radar apparatus.

An unfolded range-doppler matrix originating from a burst comprises a number of identical range-doppler matrices linked together and in this way covers the entire specified range-doppler range. A target will then appear more than once in the unfolded range-doppler matrix, exactly once per original range-doppler matrix. One of these represents the true target, the others are ghosts obtained by aliasing. By subsequently summing the unfolded range-doppler matrices obtained from various bursts element by element, on the basis of the normalised echo strength, the combined range-doppler matrix is obtained. For the true target, this will result in a summation of the range-doppler elements representing the target, whereas the ghosts, which emerge at ever-changing places, will hardly ever be summed. After combining, the true target will therefore have a greater amplitude than the ghosts that are not summed.

In a further advantageous embodiment of the invention the background matrices are also unfolded and the estimated backgrounds are summed element by element to yield threshold values for the combined range-doppler matrix.

With respect to a strong target, the individual ghosts may, in addition to the true target, also occasionally cross the threshold. A further favourable embodiment of the radar apparatus is thereto characterised in that the threshold circuit further comprises a decision circuit for determining, per combined range-doppler element causing a threshold crossing, the unambiguous target range and target velocity and for subsequently removing the ghost targets representing that target from the combined range-doppler matrix.

Since the sum of the normalised echo strengths of the combined true target is always greater than the sums of the normalised echo strengths of combined ghosts, it is possible to determine the true target on the basis of the greatest sum and to calculate and remove the ghosts associated with that target.

In order to minimize the computing work for the decision circuit it is of advantage to remove known targets from the range-doppler matrix before unfolding. This prevents the occurrence of ghosts which will subsequently have to be removed again.

Additionally it can be stated that the combination of echo strengths and the subsequent thresholding of the combined echo strength is in fact only useful for weak echoes whose detection probability is insufficient prior to combination. To this end, the apparatus can advantageously be provided with a preselector which on the basis of consecutively generated range-doppler matrices, combines in a manner known in the prior art strong echoes to yield echoes with unambiguously determined target range and target velocity and which removes these echoes from the range-doppler matrices before these are unfolded. This further limits the amount of computing work for the decision circuit.

BRIEF DESCRIPTION OF THE DRAWING

The radar apparatus according to the invention will now be further described with reference to FIG. 1 that represents a block diagram of a radar apparatus according to the invention.

DETAILED DESCRIPTION OF THE INVENTION

Figure 1:
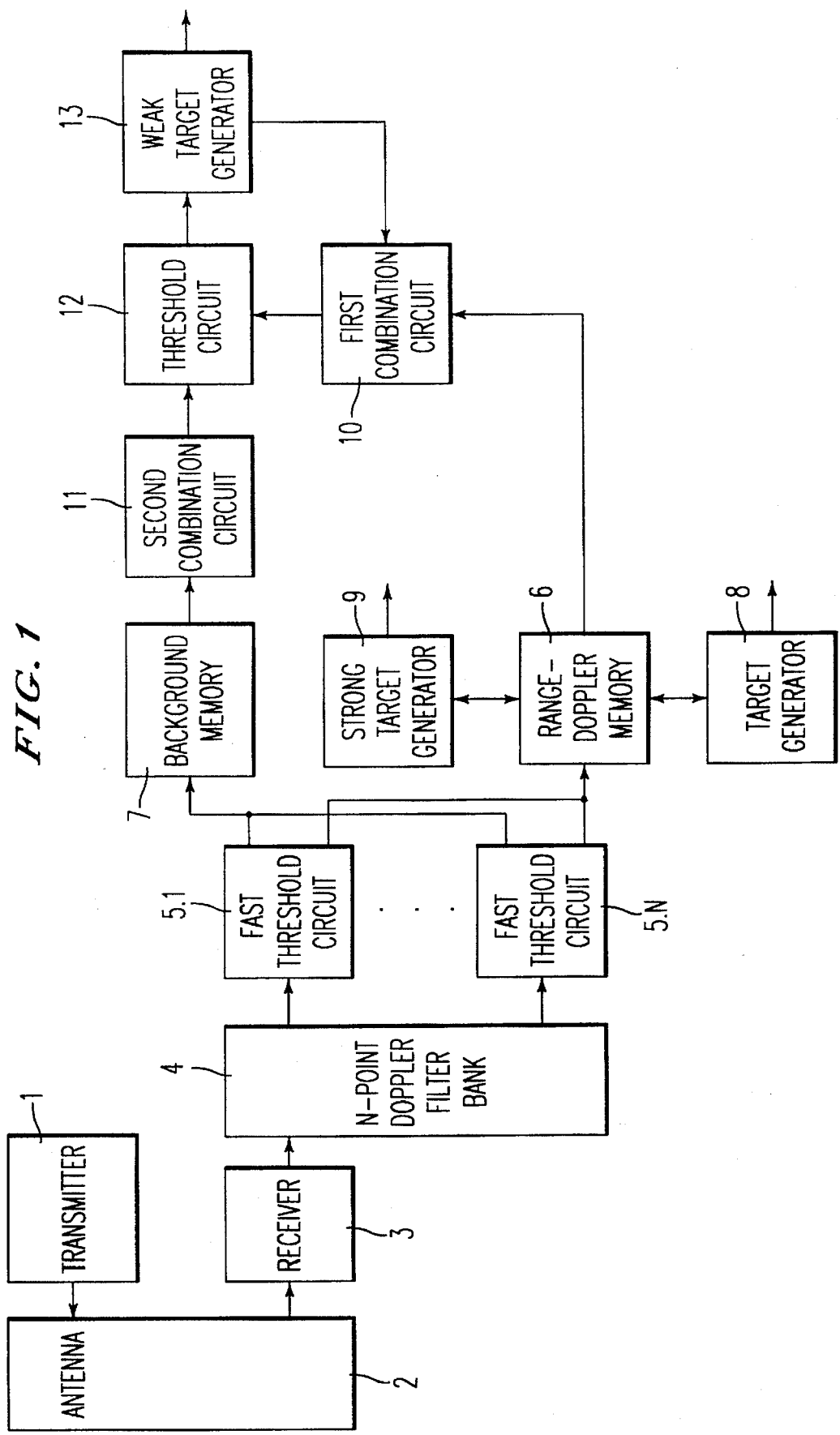

FIG. 1 represents a block diagram of a radar apparatus according to the invention. Transmitter means 1 generate bursts of radar transmit pulses which are transmitted via antenna means 2. Receiver means 3 connected to the antenna means 2 receive echo signals which are applied to a N-point doppler filterbank 4, for instance a 16-point FFT unit which processes the echo signals per burst after which these signals are applied to fast threshold circuits 5.1, . . . 5.N. Fast threshold circuit 5.i estimates the background of each range quant in a manner known in the prior art, for instance on the basis of the echo strengths in adjacent range quants. A normalised echo strength is subsequently derived from the echo strength in a range quant and the background representing this range quant. Subsequently, a normalised echo strength is derived from the echo strength in a range quant and the background representing this range quant, for instance by dividing the echo strength by the background and raising this to the square. The resulting normalised echo strengths are then stored as a range-doppler matrix in range-doppler memory 6. The associated backgrounds are also squared and stored as a background matrix in background memory 7. This enables storage of the range-doppler matrices and the background matrix representing a number of bursts emitted in one direction, each of which usually has a different PRF and is emitted at a different radar transmit frequency.

The fast threshold circuits 5.1, . . . 5.N can also be used for pre-thresholding the echo strengths to be stored in range-doppler memory 6. This implies the thresholding of an echo strength with the associated background plus an additional threshold value after which a zero is written in range-doppler memory 6 in case a threshold crossing fails to occur. This pre-threshold entails the advantage that many range-doppler elements will be zero, which reduces the amount of calculations required. A disadvantage, however, is that a detection loss determined by the additional threshold value may arise.

Transmitter means 1, antenna means 2 and receiver means 3 are preferably integrated to constitute a phased array system, although the invention is also suitable for the more conventional types of radar, provided that it enables the emission of several bursts of radar transmit pulses per direction.

According to the inventive principle underlying the invention it is of advantage, at least for weak targets, to first combine the target echoes originating from different bursts and only then to proceed to thresholding to achieve a possible detection. This process, called cluster before detect, involves a lot of computing work. In view of this it is advisable to remove the known echoes, for instance known from a track process, from the range-doppler matrices first. This is effected in a target generator 8 known in the prior art and is based on the principle that a target's strength, range and doppler velocity undergo only few changes when compared to previous measurements and that any changes occurring are moreover highly predictable. For a track process, the known target generator consequently yields the new target strength, range and doppler and moreover removes the echoes associated to this target from the range-doppler matrices.

For strong echoes with a high normalised echo strength, it is furthermore possible to directly determine, in a manner known in the prior art, the unambiguous range and doppler from the available range-doppler matrices in strong target generator 9. Instead of applying the cluster before detect principle, individual range-doppler matrices are thresholded on the basis of the associated background matrices stored in background memory 7 plus an additional threshold value; the sufficiently strong echoes are subsequently combined to ascertain the unambiguous range and doppler values of the associated targets. These matrices are handed over to a processor to be connected to the radar apparatus after which the associated echoes will be removed from the range-doppler matrices. Eventually, these matrices will only comprise weak echoes of possible potential targets.

To enable the cluster before detect process, a range-doppler matrix is unfolded in range and in doppler to yield an unambiguous range-doppler matrix, in which a target is sure to be unambiguously present along with a number of ghost targets, also called ghosts. How often a range-doppler matrix will be unfolded will depend on the PRF, the radar transmit frequency and the specified maximum range and maximum doppler velocity. In case of a PRF of for instance 5 KHz, the ambiguous range is 30 km. If the specified maximum range is 150 km, unfolding in range will be required five times. This PRF enables a doppler frequency of 0–5 KHz to be sampled, which, at a radar transmit frequency of for instance 10 GHz will amount to 75 m/s. For a specified velocity range of –600 m/s to 600 m/s, unfolding in doppler will consequently be required 16 times. For each target, the unfolded range-doppler matrix then comprises one true target and 47 ghost targets, all having an identical normalised echo strength.

The unfolded range-doppler matrices are written in a memory field in a first combination means 10, in which process said matrices are moreover summed in succession for all bursts to be combined. It should be noted that the normalised echo strengths are summed for real targets, which at least for minor variations in the PRF and for minor variations in the radar transmit frequency emerge at the same place in each unfolded range-doppler matrix. Ghosts, on the contrary, emerge at ever-changing places and will therefore be very rarely summed. Summation will consequently cause an increase in the echo strength of true targets, which will not be the case with ghosts. Subsequently, the combined range-doppler matrix generated in first combination means 10 is applied, together with an unfolded and combined background matrix similarly generated in second combination means 11, to threshold circuit 12 that generates a detection in case of a threshold crossing. The threshold crossing is applied to weak target generator 13, which generates the target strength, target velocity and doppler of the associated target to enable further processing and which moreover removes the target plus the associated ghosts from the combined range-doppler matrix. In this way, all targets can be detected by starting with the strongest echo in the combined range-doppler matrix.

If significant variations occur in the PRF or the radar transmit frequency, additional measures will be required to sum the different unfolded range-doppler matrices without any losses, since the scale differs at least in doppler direction. A case in point would be a radar apparatus operating at bursts of 16 pulses with a PRF of 5 KHz and a radar transmit frequency of 10 Ghz. The range-doppler matrix will then have doppler quants of 75/16 m/s. A reduction of the PRF to 4 KHz will result in doppler quants of 60/16 m/s. In case of different range-doppler matrices, a target with a certain velocity will therefore emerge in different columns. This problem can be elegantly solved by proportionally varying the radar transmit frequency and the PRF which, as is well-known, does not affect the size of the doppler quants. Should this prove to be impossible, or inexpedient, interpolation in one way or another will be required before proceeding to combine the unfolded range-doppler matrices. It is for instance possible to represent the unfolded range-doppler matrix on a standard matrix which, in range, has the same range quants as the range-doppler matrices, but, in doppler, has doppler quants that are smaller. The standard matrix then forms part of first combination means 10 and is filled by means of the unfolded range-doppler matrices, each matrix element of the standard matrix being filled by means of the nearest matrix element from the unfolded range-doppler matrix or from an interpolation of the nearest matrix elements.

Furthermore, doppler straddling, caused by the required weighting performed in doppler filterbank 4 may occur, as a result of which a target is visible in several contiguous filter outputs, which renders the interpolation less critical.

It is possible for a strong interference pulse to emerge in one single range-doppler matrix without additional measures; this would cause a threshold crossing after unfolding and combining. In order to suppress interference pulses, the presence of an echo in at least N out of M original ambiguous range-doppler matrices is ascertained, which matrices are available in range-doppler memory 6. How N and M are selected depends on the number of bursts that is combined in the combined range-doppler matrix, of the similar element in the additional matrix and of the desired false-alarm rate and detection probability. If the echo meets the N out of M criterion, it is passed on for further processing.

The target generators 8, 9 and 13, the combination means 10, 11 and the threshold circuit 12 can advantageously be realised as suitably programmed digital signal processors (DSPs), acting on one memory field incorporating range-doppler memory 6, background memory 7 and the memory fields of first combination means 10 and second combination means 11.

We claim:

1. A radar apparatus for detecting a target, comprising:
an antenna;
transmitting means, connected to said antenna, for generating plural bursts of radar transmit pulses, each having a pulse repetition frequency and a radar transmit frequency;
receiving means, connected to said antenna, for receiving plural signals indicative of said plural bursts of radar transmit pulses;
a doppler filterbank connected to said receiving means and configured to generate plural range-doppler matrices, each comprising range-doppler elements and corresponding to respective of said plural bursts;
combination means for combining the plural range-doppler matrices to provide a combined range-doppler matrix; and
threshold means for thresholding the combined range-doppler matrix so as to detect the target.

2. The radar apparatus according to claim 1, wherein said combination means further comprises:
first unfolding means for two-dimensional unfolding of the plural range-doppler matrices to obtain respective unambiguous range-doppler matrices in which said target is unambiguously represented; and
first summing means for summing the respective unambiguous range-doppler matrices to obtain the combined range-doppler matrix.

3. The radar apparatus according to claim 1, wherein said range-doppler elements comprise normalized echo strengths.

4. The radar apparatus according to claim 2, further comprising a background matrix generating mechanism configured to generate a respective background matrix corresponding to each of said range-doppler matrices, each background matrix comprising plural background matrix elements each representing an estimated background level corresponding to respective of said range-doppler elements.

5. The radar apparatus according to claim 4, wherein said combination means further comprises:
second unfolding means for two-dimensional unfolding of the background matrices; and
second summing means for summing the plural background matrix elements of respective background matrices to provide threshold values for the combined range-doppler matrix.

6. The radar apparatus according to claim 5, wherein said thresholding means further comprises a decision circuit configured to determine when respective combined range-doppler elements exceed a respective threshold value, determine an unambiguous target range, an unambiguous target velocity, and determine and remove at least one ghost target based on the combined range-doppler matrix.

7. A radar apparatus for detecting a target, comprising:
an antenna;
a transmitter connected to said antenna that generates plural bursts of radar transmit pulses, each of said plural bursts having a pulse repetition frequency and a radar transmit frequency;
a receiver connected to said antenna that receives plural signals indicative of said plural bursts of radar transmit pulses returned from said target;
a doppler filterbank connected to said receiver and configured to generate plural range-doppler matrices corresponding to respective of said plural bursts, each of said plural range-doppler matrices comprising range-doppler elements;
a combination mechanism that combines the plural range-doppler matrices to provide a combined range-doppler matrix; and
a threshold mechanism that detects the target by thresholding the combined range-doppler matrix.

* * * * *